April 2, 1963

W. M. SHOFFNER 3,083,791

CHECK-OUT COUNTER AND CART

Filed July 8, 1960

INVENTOR.
WILLIE M. SHOFFNER
BY
Toulmin & Toulmin
ATTORNEYS

United States Patent Office 3,083,791
Patented Apr. 2, 1963

3,083,791
CHECK-OUT COUNTER AND CART
Willie M. Shoffner, R.R. 1, New Lebanon, Ohio
Filed July 8, 1960, Ser. No. 41,540
18 Claims. (Cl. 186—1)

This invention relates to check out counters of the nature that are widely employed at the present time in retail markets and wherein the customer collects the merchandise which he desires to purchase in a cart and moves the cart to a check out station where a register operator rings up the amount of the sale and the merchandise is packaged.

Check out arrangements of this nature are well known and while they have progressed in efficiency and improved design over a period of years, there are certain objectionable features still present in such systems which it is proposed to eliminate by the present invention.

The usual check out counter comprises a conveyor belt of some six to eight feet in length on which the customer places the merchandise while removing it from the cart and which conveyor belt is actuated by the cash register operator to move the merchandise up to the cash register where it is tallied by the register operator. Simultaneously, the register operator removes the merchandise from the conveyor belt and transfers it to a receiving area, such as a rotary table or the like from which it can be picked up by another attendant and placed in boxes or bags.

Many customers dislike the work of removing the articles from the cart and transferring them to the conveyor belt, at best, this is an awkward operation. In some regions it is not permitted for the purchaser to transfer the merchandise from the cart to the checking out station and this requires that the cash register operator or still another attendant removes the articles from the cart and places them in the area where they are to be checked.

Having the foregoing in mind, it is a primary object of the present invention to provide a new and greatly improved check out arrangement specially for retail stores of the nature generally described above, which will overcome the objections and difficulties above referred to.

Still another object of this invention is the provision of the improved and novel check out arrangement for merchandise particularly in retail store outlets which is more compact than check out arrangements heretofore known.

Still another object is the provision of the check out arrangement of the nature referred to which is more rapid in operation than known arrangements.

It is also an object to provide a check out arrangement in which the labor of removing the articles from the transporting cart to the check out area is removed from the purchaser and is substantially completely removed from the register operator.

Still another object of this invention is the provision of a specially designed cart for use in a check out arrangement of the nature referred to and which cart can be arrived at by conversion of existing carts.

It is a still further object of this nature to provide a novel check out arrangement and a method of checking out merchandise which is extremely flexible so that installations according to this invention can be made in circumstances where conventional known check out arrangements could not be employed.

The foregoing objects as well as still other objects and advantages of this invention will become more apparent upon reference to the following specification taken in connection with the accompanying drawings in which.

General Arrangement

A checking out arrangement according to the present invention consists of a checking out unit designed to cooperate with a special cart construction. This cart differs from known carts in that the bottom and front surface of the cart is in the form of a flexible belt. The rear end of the flexible belt is attached to the swingable back end of the cart and the front edge of the belt, which is at the top of the front edge of the cart, is adapted for being moved by a driving instrumentality associated with the check out counter so that the belt is drawn toward the top front edge of the cart, and in this manner pulls merchandise in the cart upwardly and toward the front end of the cart which can easily be reached by the register operator standing adjacent the front edge of the cart.

The movement of the belt is under the control of the register operator by means of a manual switch and this permits the merchandise to be pulled upwardly in the cart as rapidly as it can be checked out.

According to one modification of the invention, there is a reel at the cart end of the counter that engages the end of the belt in the cart and which reel is driven so as to pull the belt upwardly and forwardly in the cart.

According to another modification, a pair of gripper rolls in the cart end of the counter engage the end of the belt so the belt is drawn through the rolls as they are driven.

According to a still further modification of the invention, the belt is connected at its upper front edge with a spring biased roller in the cart so that the belt moves downwardly in the cart as the cart is loaded and then, when the cart is brought to the check out station the roller is driven to roll the belt up on the roll and thus carry the merchandise upwardly.

The described arrangement eliminates the usual conveyor belt associated with check out counters thus making the counter more compact and permitting different arrangements thereof than could be made with a check out counter having as a part thereof the conveyor belt referred to.

Structural Arrangements

Figures 1, 2, 6, 7:
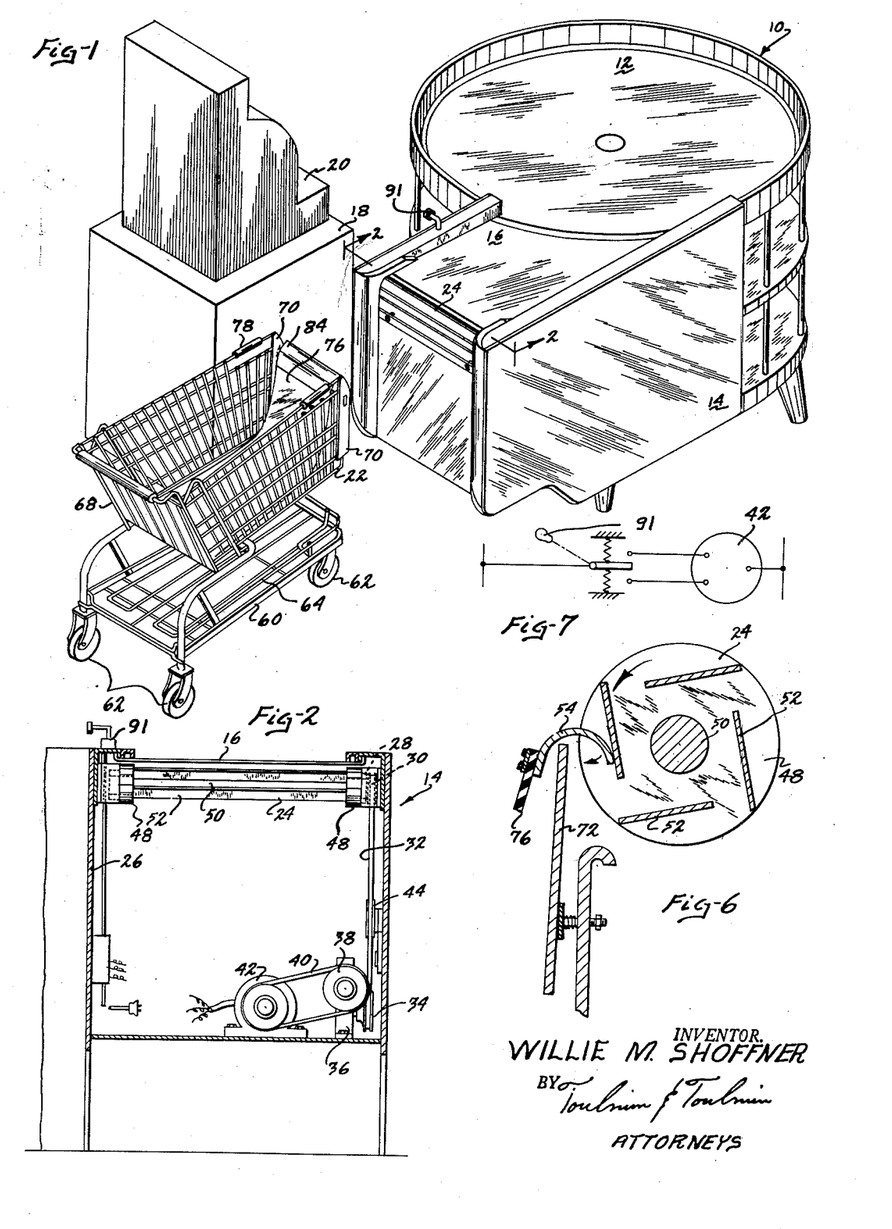
FIGURE 1 is a perspective view of a preferred arrangement of the present invention showing a cart approaching the check out station.
FIGURE 2 is a vertical sectional view indicated by line 2—2 on FIGURE 1 showing some of the operating mechanism of the check out counter.
FIGURE 6 is an enlarged fragmentary sectional view showing details of construction of a take-up reel that is positioned at the cart end of the check out counter, and the adjacent portion of the cart of the present invention.
FIGURE 7 is a diagrammatic representation of the control circuit for a reversible motor drivingly connected with the reel of FIGURE 6.

Referring to the drawings somewhat more in detail, FIGURE 1 shows a check out counter generally indicated at 10 and which may comprise the usual rotary table 12 to which the articles of merchandise are moved by the register operator as they are checked out. Extending tangentially from counter 10 is a portion 14 of the check out counter which comprises a platform 16 at the top along which the articles are moved in being delivered to table 12. This platform may be somewhat inclined toward the rotary table in order to permit sliding of the articles of merchandise thereover.

Adjacent the end of the projecting portion 14 opposite table 12 is a table or stand 18 on which the cash register 20 is mounted and in front of which the register operator stands.

FIGURE 1 also illustrates a merchandise pickup cart 22 according to this invention approaching the end of projecting portion 14 prior to a checking out operation.

Figures 3, 4, 8:
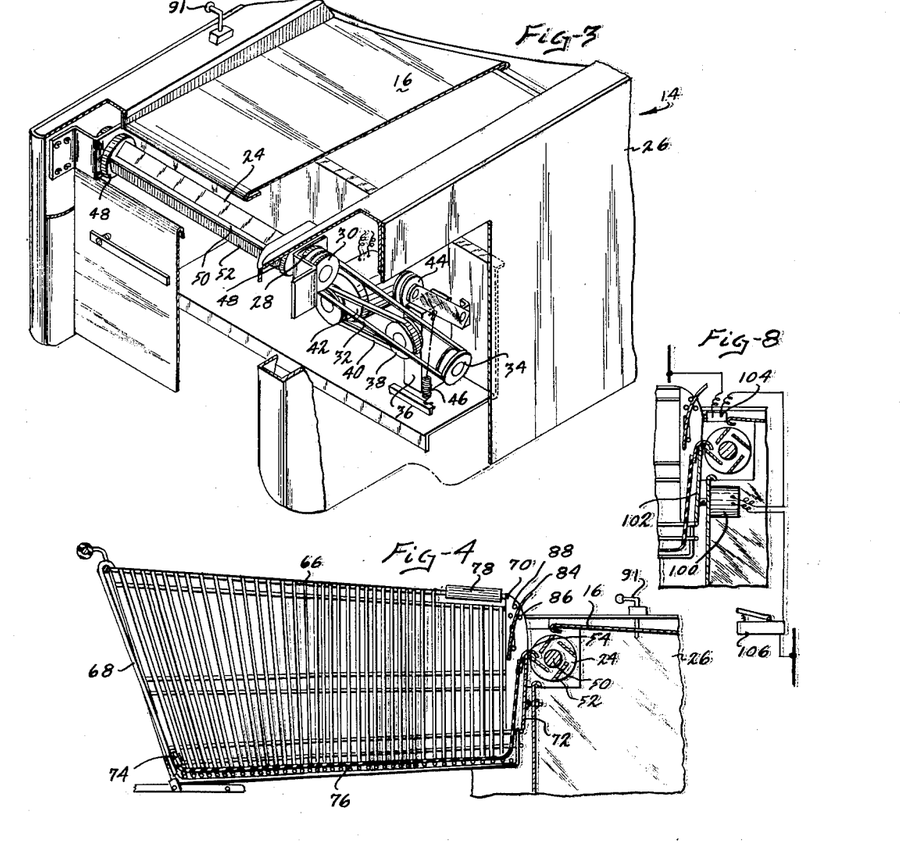
FIGURE 3 is a perspective view partly broken away from the end of the check out counter against which the cart is placed when merchandise is being checked out.
FIGURE 4 is a sectional view through a cart in position for a checking out operation at the end of the check out counter and also through the adjacent end of the check out counter prior to the initiation of the checking out operation.
FIGURE 8 is a fragmentary diagrammatic view showing the counter end of the cart and the adjacent portion of the counter illustrating an electromagnetic arrangement for holding the cart in place against the counter during the checking out operation.

Reference to FIGURES 2, 3, and 6 will show that positioned at the upper end of the projecting portion 14 that is opposite table 12, there is a reel member 24 rotatably supported in the frame 26 of the check out counter as by the bearings 28. This reel has connected thereto a pulley 30 driven by a V belt 32 that passes about the pulley 34 of a reduction gear unit 36 having an input pulley 38 driven by V belt 40 which is driven by a motor 42. An idler pulley 44 bears on one reach of belt 32 and is spring urged theretoward by spring 46 to maintain a good driving engagement of the said belt with its pulleys.

The reel 24 consists of spaced end discs interconnected by a shaft 50 on which the aforementioned pulley 30 is mounted and between the end discs and parallel the shaft 50 there extends circumferentially spaced plates 52 having their one edges spaced close to the peripheries of discs 48 and the other edges located radially endwardly from the edges of the end discs. By this arrangement rotation of the reel in a clockwise direction as it is viewed in FIGURE 6 provides the reel with a series of hooklike edges adapted for engaging a hook member 54 on the belt in the cart so that the belt will be caught on the reel and will wind up thereon. Rotation of the reel in the opposite direction will, of course, unwind the belt.

Figures 9, 10, 11, 12:
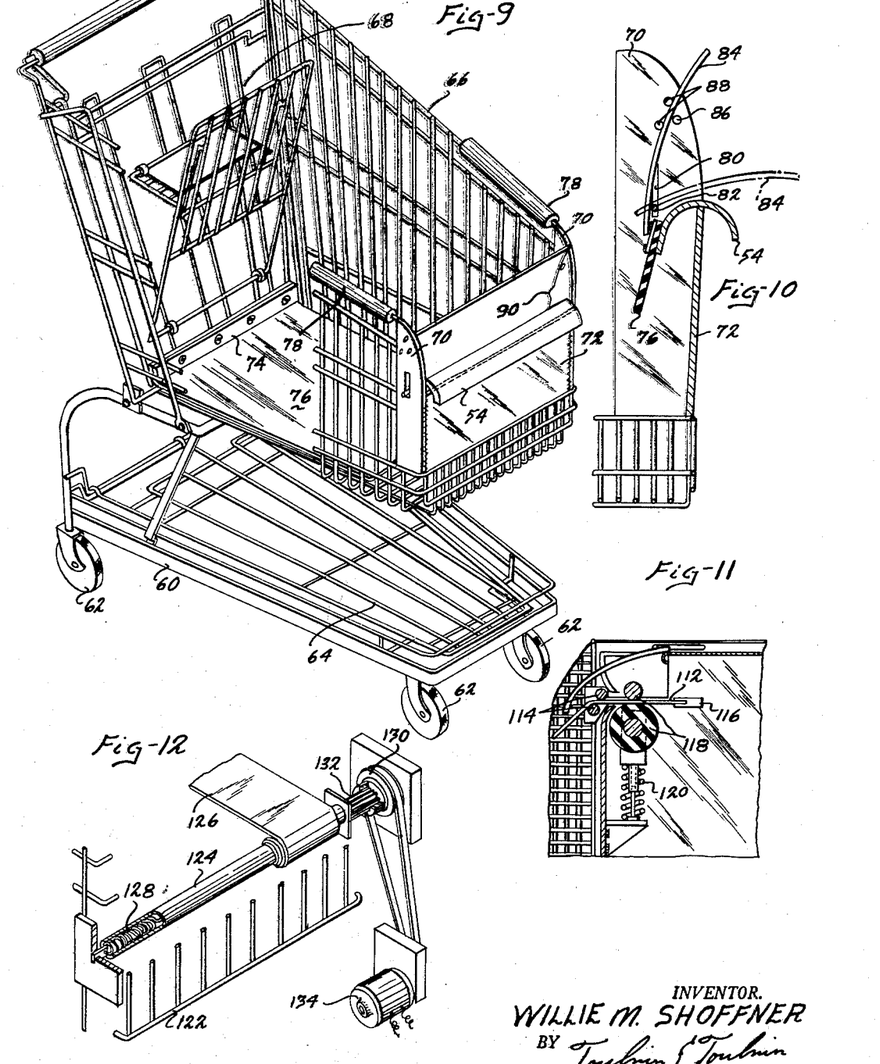
FIGURE 9 is a perspective view drawn at somewhat enlarged scale showing a cart constructed according to this invention.
FIGURE 10 is a fragmentary view of a section of the front end of the cart showing a curved plate carried by the cart and adapted for being moved in position to rest on the end of the check out counter to form a bridge between the cart and counter during a check out operation.
FIGURE 11 is a fragmentary view of the front end of the cart and the adjacent end of the counter showing a modified construction according to this invention.
FIGURE 12 is another perspective view partly in section showing the front end of another cart construction according to this invention and the relationship thereof to a drive means in the counter for operating the cart during a checking out operation.

Turning for the moment to the cart itself, this is best illustrated in FIGURES 9 and 10 wherein the cart will be seen to comprise a frame 60 having four relatively large caster wheels 62 as opposed to the provision in the conventional cart of only two caster wheels at the rear. The cart has lower platform 64 and a basket 66 toward the top. Basket 66 has a rear wall 68 hinged to an upper portion of the basket so that it is lower and can be swung inwardly of the basket. This is conventional cart construction and permits the carts to be stored by telescoping them together.

According to the present invention the front wall of a conventional cart basket is lowered in height somewhat and is provided with side plates 70 at the forward edge. There may be a transverse plate 72 extending between the side plates or this portion of the basket may consist of the conventional grille construction.

Attached to the lower end of the swingable back wall 68 as by the connecting means 74 is a flexible belt 76 that extends along the bottom of the basket toward the front and then upwardly along the front wall to the region of the upper edge thereof and at which point the belt has attached thereto the transversely extending hooklike member 54 previously referred to.

The cart according to this invention advantageously has hand grip members 78 at the top edge near the front for manipulation of the cart by the register operator.

The aforementioned side plates 70 are provided with vertical slots 80 therein that receive the ends of a transversely extending rod 82 to which is attached a curved plate 84. Plate 84 is normally disposed in the position in which it is illustrated in FIGURES 9 and 10 and is held in that position by the dimples 86 and 88 formed inwardly in the side plates 70.

Plate 84 can be released from its vertical position so that it can lay outwardly over the end of portion 14 of the check out counter by lifting the plate upwardly until the notch means 90 therein register with dimples 86 in front of the plate whereupon the plate can be tilted outwardly into its dot-dash position of FIGURE 10.

Returning now to FIGURES 3, 4, and 5 it will be seen that platform 16 of the projecting portion 14 of the check out counter terminates vertically above reel 24 at its outer edge. The platform is thus in position to support the outer edge of bridging plate 84 as will be seen in FIGURE 5.

Operation of First Embodiment

In the operation of the first embodiment, the shopper selects a cart in the conventional manner and selects the desired merchandise and places it therein. When it is desired to check the merchandise out, the shopper pushes the cart up toward the check out counter as is illustrated in FIGURE 1. The cart may be moved by the shopper completely up against the check out counter to the position in which the cart is illustrated in FIGURE 4, or it may be moved fairly close to this position by the shopper and when the merchandise is to checked out the register operator can grasp the adjacent hand grip 78 and pull the cart into its FIGURE 4 position.

Figure 5:
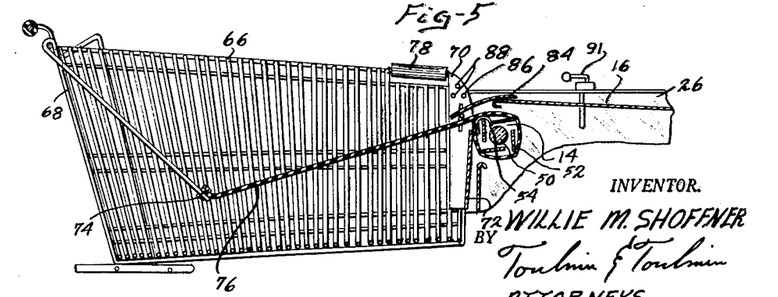
FIGURE 5 is a view like FIGURE 4 but showing the checking out operation in an intermediate stage of completion.

After the cart is in FIGURE 4 position, motor 42 is energized by manipulation of a switch 91 which is located conveniently for the register operator. As will be seen in FIGURE 7, this switch is normally centered so that motor 42 will operate only so long as the switch is held in forward position. When the motor is energized the wheel commences to rotate and picks up hook member 54 and draws the belt from its FIGURE 4 position upwardly toward the position in which it is illustrated in FIGURE 5. This will cause the articles of mechandise in the cart to be pulled upwardly toward the register operator so that they can conveniently be handled by the operator and checked out and then placed on platform 16 and moved therealong to table 12. Prior to energizing the motor 42, of course, the register operator moves front plate 84 from its FIGURE 4 to its FIGURE 5 position.

After the cart has been completely unloaded the register operator again manipulates switch 91, but at this time in a manner to cause the reel to run in the reverse direction and this will feed the belt back into the cart and release the belt from the wheel. At this time the positioning of the plates 52 in the reel permits the reel to overrun after the belt has come to a halt without creating any difficulties.

The register operator then pushes the cart away from the check out station and a new cart can be brought into position to be checked out.

There may be provided, if so desired, at the end of projecting portion 14 a laterally extending bumper bar 92 that engages the front end of the cart, for example, plate 72 so that the cart will be brought to a resilient halt when it is pulled against the end of the counter without objectionable jarring of the contents of the cart.

The described arrangement is extremely rapid and efficient, it relieves the shopper of the labor of lifting the mechandise out of the cart, reduces the size of the check out station, and eliminates extra attendants.

*Sound Embodiment*

In the previously described arrangement a cart was positioned at the end of the check out counter and the belt was engaged by the reel and this served to hold the cart in position. It may be preferable, in certain instances, however, to provide other means for holding the cart in place during a checking out operation. One such arrangement is illustrated in FIGURE 8 wherein the end of the counter is provided with electromagnetic means 100 that co-operates with a magnetic plate element 102 on the end of the cart to draw the cart into position at the end of the counter and to hold it therein. The electromagnet is adapted for being energized by closing of a limit switch 104 which is actuated into closed position by the cart as it approaches its unloading position at the end of the check out counter.

When the checking out operation is completed, the cart is released from the end of the counter by de-energizing the electromagnetic means which may be done by way of the foot switch 106 located in a position where it is convenient for the register operator to actuate.

Figure 17:
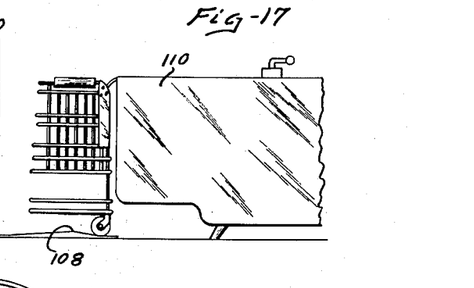
FIGURE 17 is a fragmentary side elevational view of a checking out arrangement according to this invention in which small ramps or the like are employed for holding the cart in position at the end of the check out counter during a checking out operation.

Still another manner of urging the cart toward position at the end of the check out counter is illustrated in FIGURE 17 wherein there is provided a ramp means 108 that provides an incline for receiving at least the front rollers of the cart when it is brought into position at the end of the check out counter 110 so that the cart will be urged toward the end of the check out counter. When the cart is unloaded the ramp means will offer little resistance to movement of the cart away from the check out counter.

*Third Embodiment*

In the first embodiment described above the belt forming the bottom and front walls of the cart basket was engaged by a reel and wound up thereon in order to lift the contents of the cart upwardly and forwardly toward the register operator.

FIGURE 11 shows another manner in which the belt could be engaged and actuated. In this view the belt 112 passes through a pair of guide rods or rollers 114 on the end of the cart which serves to support the edge of the belt so that it extends outwardly substantially horizontally in front of the cart. The projecting edge of the belt has adapted thereto a member 116 which, when the cart is in place at the check out counter, it is adapted for being caught in the bight of the rollers 118 of which the lower one is rubber covered and is driven. A spring 120 urges the rollers toward each other so that the belt will be driven thereby toward the right as viewed in FIGURE 11 to unload the cart, and to the left to return the belt into the cart.

*Fourth Embodiment*

In FIGURE 12, there is shown a fragmentary view of a cart 122 which has at its upper front edge a roller 124 about which the belt 126 forming the bottom and front walls of the cart basket is wrapped. This roller, which is similar to a blind roller for windows, includes a spring 128 that biases the roller in a direction to wrap the belt up thereon. When the cart is loaded with merchandise, the weight of the articles placed in the basket of the cart position the belt downwardly and the spring unwinds.

After the cart in FIGURE 12 is completely loaded it is brought to the check out counter wherein there is a driven pulley 130 having a spline recess therein adapted for receiving the spline end 132 of roller 124. Engagement of the roller with the pulley can easily be effected by a slight lateral movement of the forward end of the cart after it is in place at the check out counter. Thereafter, energization of motor 134 which is drivenly connected with pulley 130 will drive roller 124 in a direction to wrap the belt thereon thereby to lift the articles in the cart basket upwardly and move them forwardly toward the register operator.

After the cart has been unloaded it is not necessary to drive the motor 134 in the opposite direction because at this time the belt 126 will be in its rest position so that it is only necessary to disengage the spline 132 from the pulley and to push the cart away from the check out counter.

It has been mentioned before that the check out counter of the present invention and the special cart arrangement associated therewith impart a great deal of flexibility into the check out counter because it can be made so compact that it can be utilized where conventional check out counters cannot be employed.

FIGURES 13 through 16 show some of the possible arrangements that can be made with check out counters according to the present invention.

Figure 13:
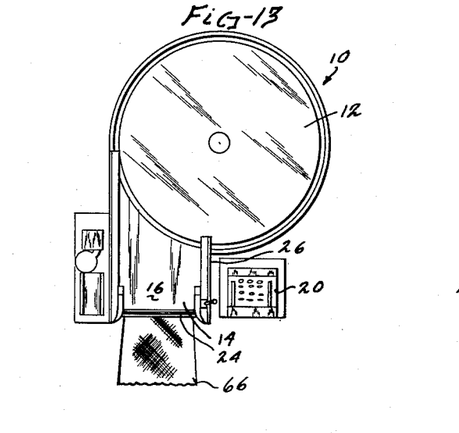
FIGURES 13, 14, 15, and 16 are rather diagrammatic plan views showing different arrangements of a checking out structure according to the present invention.

FIGURE 13 is a plan view showing a check out counter substantially of the nature described wherein the cash register 20 is positioned to one side of the projecting portion 14 of the check out counter.

Figure 14:
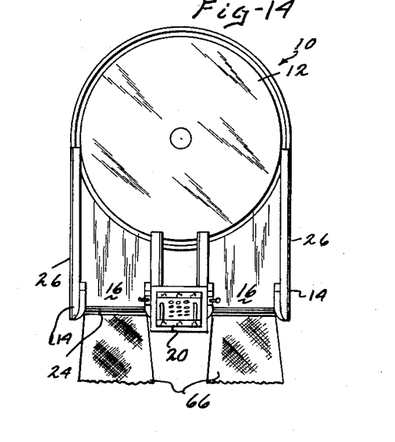

FIGURE 14 shows a similar arrangement except that the register 20 sets between the projecting portion 14 at the one side and a second projecting portion 14' at the other side both leading to the same rotary receiving table 12. This arrangement permits one cash register operator to operate two lanes and permits two check out stations to be located in the same space normally occupied by one check out station.

Figure 15:
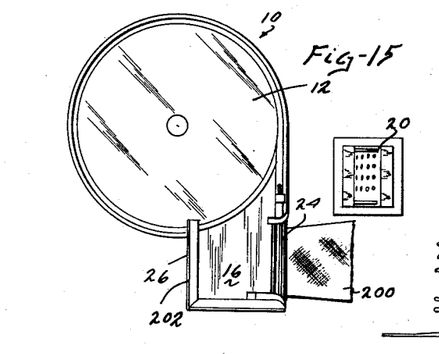

In FIGURE 15 the cart 200 is adapted for being brought in from the side of a projecting portion 202 from the check out counter and the mechanism for operating the front and back walls of special carts will be located on the side edge of the projecting portion instead of the end thereof. In this case cash register 20 is turned to permit the operator to stand in the proper position relative to the cart and the check out counter.

Figure 16:
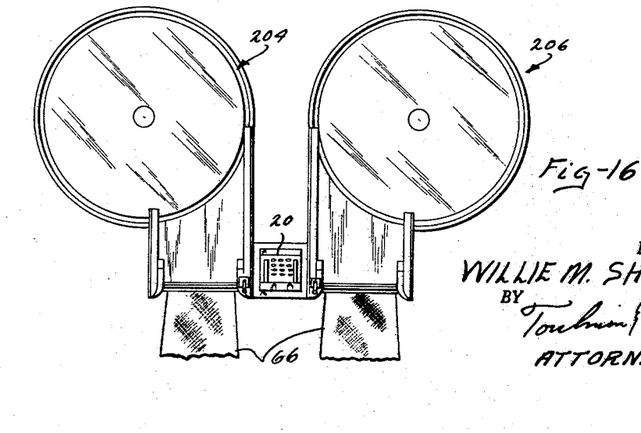

In FIGURE 16 there is a first check out counter 204 substantially identical with the first described modification of the present invention and a second counter 206 which is in the form of a mirror image thereof. Cash register 20 is between the projecting portions thereof so that the register operator can perform checking out operations on both counters from the same position as in the case of the FIGURE 14 modification, but, in the case of FIGURE 16, the merchandise for the check out stations is delivered to individual rotating tables.

*Fifth Embodiment*

FIGURES 18 through 21 show another embodiment of the present invention in which the cart is constructed in a somewhat different manner so as to eliminate the inwardly swinging back wall that is characteristic of conventional carts of this nature which permits them to be telescoped together when not in use. In this modification, the inwardly swinging back wall is eliminated and, instead, the flexible belt member in the basket portion of the cart extends down the front wall and across the bottom wall and up the back of the basket to the top thereof thus forming the back closure member of the basket. This will be seen in the drawings wherein the basket poriton of the cart is constructed of an expanded metal member 300 that forms the sides and bottom of the basket and is in one piece. Along the top edges of member 300 there may be mounted the tubular elements 302 which may, for example, comprise slit tubing.

Figures 18, 19, 20, 21, 22, 23:
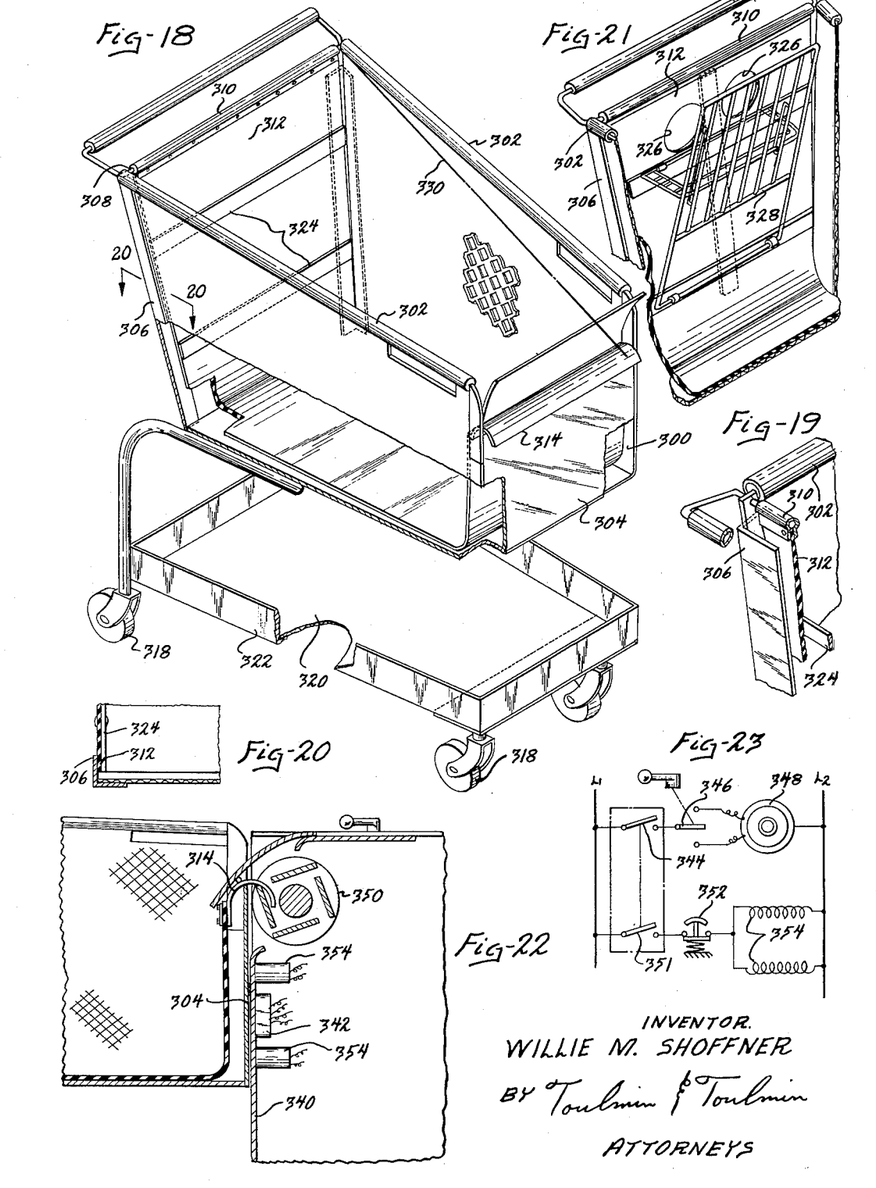
FIGURE 18 is a perspective view similar to FIGURE 9 but showing a modified construction.
FIGURE 19 is a fragmentary perspective view showing the rear corner of the cart of FIGURE 18.
FIGURE 20 is a sectional view indicated by line 20—20 of FIGURE 18.
FIGURE 21 is a fragmentary perspective view showing the manner in which a baby seat could be included in the cart construction of FIGURE 18.
FIGURE 22 is a sectional view similar to FIGURE 4 illustrating the manner in which a proximity switch can be arranged to be controlled by the cart.
FIGURE 23 is a diagrammatic electrical diagram utilizing the proximity switch of FIGURE 22.

In the front end of the basket there is a steel plate 304 extending transversely and welded to the front edge of the expanded metal member 300.

At the back edges of member 300 there are the vertically extending angles 306 that extend inwardly from the side edges of member 300 to form ledges against which the belt member in the basket will rest. A rod 308 extends transversely of the basket in the rear end thereof at the top and mounted thereon is a sleeve member 310 that is attached to the rear edge of the flexible rubber-like belt member 312 that extends down the back of the basket and forwardly along the bottom and up the front wall where it is connected with the hook member 314 that engages the top edge of front wall 304 in the same manner as hook member 54 of the first described cart engages the top edge of the front wall plate 72. The basket of the cart in FIGURE 18 is supported on any suitable tubular supporting structure 316 which has the four caster wheels 318 as in the previously described modification.

The shelf at the bottom of the cart is preferably made of a member 320 which is expanded metal with an upstanding edge 322 which may be expanded metal or which may be a solid strip.

The belt member 312 at the back preferably has two or more transversely extending stiffening cleats 324 which prevent the belt member from bending backwardly between the side flanges 306.

As will be seen in FIGURE 21, the back portion of the belt member may have apertures 326 therein which, in combination with the collapsible seat structure 328 will convert the cart into a type having a baby seat.

The cart in FIGURES 18 through 21 has the advantage that the heavy expensive swinging gate at the back is eliminated and, instead, the relatively light belt member is extended to form the back wall. The cart can still be telescoped in the usual manner.

When the belt member is drawn up tight on the reel during an unloading operation, on account of the lightness of the belt it will extend in substantially a straight line downwardly from rod 308 to the take-up reel. This is indicated by the dot-dash line 330 in FIGURE 18. This facilitates removing articles from the cart and makes the cart more convenient to use than the type having the heavy swinging back gate.

It is also proposed by the present invention to avail of a novel switching arrangement for controlling the check out counter reel and this is shown in FIGURES 22 and 23. In FIGURE 22, the end of the check out counter is formed by a plate 340 formed of aluminum or some other known magnetic material and mounted behind which plate is a proximity switch 342 which is normally open and which will close when the steel end plate 304 of the cart is brought into close proximity thereto. This switch is employed in the circuit of FIGURE 23 wherein it will be seen to comprise a first blade 344 in series with manual switch 346 that controls reversible motor 348 operatively connected to the take-up reel 350 of the check out counter.

The proximity switch comprises a second blade 351 in series with the normally closed foot operated switch 352 that is in circuit with the electromagnets 354 of the check out counter which hold the cart in place during a checking out operation.

The described control arrangement is such that it is completely concealed inside the check out counter and thus provides for a more attractive appearance of the check out counter and, further, completely automatic control of the reel energizing circuit and of the energization of the cart holding solenoids is obtained. Still further, the reel of the check out counter can be operated only when the cart is in place thus providing a desirable safety feature.

From the foregoing it will be appreciated that the present invention provides for a novel check out counter arrangement and a special cart associated therewith that makes for a compact highly efficient arrangement that is adapted for use in situations that will not receive a normal check out counter. Special carts for this condition can be made by modifying existing carts, and this will, of course, represent a substantial economy in cases where it is desired to convert the system.

In many cases the check out counters themselves could be converted by eliminating the conveyor belt portions thereof and installing the belt engaging and driving means, and the controls therefor which are mounted in the projecting portion of the counter.

It is understood that the present invention is adapted for modification to adapt to various circumstances and is intended to include within this invention such modifications as may be considered to fall within the scope of the appended claims.

I claim:

1. The combination, in a merchandise check out arrangement; a check out counter having a platform for receiving articles of merchandise, a cart for transporting the articles having a basket portion at the top, said basket portion having a back wall having an upper edge pivotally attached to the upper edge of the back of the basket portion and movable inwardly of the basket portion below said upper edge, said basket portion having a bottom wall flexibly connected at the back to the bottom of the said back wall, said basket portion having a front wall flexibly connected at the bottom to the front of said bottom wall, and drive means on the counter at the end of said platform adapted for drivingly engaging said front wall and selectively energizable for moving said front wall upwardly and said bottom wall upwardly and forwardly and said back wall forwardly in said basket portion thereby to elevate articles in the cart and simultaneously to move the articles toward said platform.

2. The combination, in a check out arrangement; of a check out counter and an article transporting cart, said cart having a frame and having a basket portion in the frame at the top, said counter having an article receiving platform at about the level of the top of the basket portion of the cart, said cart having an unloading position wherein its forward end is adjacent the counter at one end of said platform, the back wall of said basket portion being pivotally attached at the top to the frame so as to be swingable inwardly of the basket portion, a belt attached to the bottom edge of said back wall and extending forwardly along the bottom of the basket portion and then upwardly along the front wall thereof, a belt engaging means carried by the check out counter at the end of said platform to engage the end of said belt when the cart is positioned at the end of the platform, and means for energizing said belt engaging means to drive the belt out of the basket portion to elevate articles in said basket portion and move them toward the said platform.

3. The combination, in a check out arrangement; of a check out counter and an article transporting cart, said cart having a basket portion at the top, said counter having an article receiving platform at about the level of the top of the basket portion of the cart, said cart having an unloading position wherein its forward end is adjacent the counter at one end of said platform, the back wall having its upper edge pivotally attached to the top of said basket portion so as to be swingable inwardly of the basket portion, a belt attached to the bottom edge of said back wall and extending forwardly along the bottom of the basket portion to the front thereof and then upwardly along the front wall of the basket portion, a belt engaging means carried by the check out counter at the end of said platform to engage the end of said belt when the cart is positioned at the end of the platform in unloading position, and means for energizing said belt engaging means to drive the belt out of the basket portion to elevate articles in said basket portion and move them toward the said platform, there being a bridge plate member movably carried by one of said cart and counter movable into position to extend between and thereby form a bridge between the front of the basket portion and said platform when the cart is in unloading position.

4. The combination, in a check out arrangement; of a check out counter and an article transporting cart, said cart having a basket portion at the top, said counter having an article receiving platform at about the level of the top of the basket portion of the cart, said cart having an unloading position wherein its forward end is adjacent the counter at one end of said platform, the back wall of said basket portion being at the top edge thereof being pivotally connected to the top of said basket portion so as to be swingable inwardly of the basket portion, a belt attached to the bottom edge of said back wall and extending forwardly along the bottom of the basket portion to the front thereof and then upwardly along the front wall thereof, said belt having a downwardly and forwardly extending hook element at its front edge, a reel having transverse blade means rotatably carried by the counter beneath the cart end of the platform positioned to overlap the hook element when the cart is in unloading position, and means for reversibly driving said reel whereby to reel the belt up under the end of the platform or to feed the belt back into the said basket portion.

5. The combination, in a check out arrangement; of a check out counter and an article transporting cart, said cart having a basket portion at the top, said counter having an article receiving platform at about the level of the top of the basket portion of the cart, said cart having an unloading position wherein its forward end is adjacent the counter at one end of said platform, the back wall of said basket portion being at the top edge thereof being pivotally connected to the top of said basket portion so as to be swingable inwardly of the basket portion, a belt attached to the bottom edge of said back wall and extending forwardly along the bottom of the basket portion to the front thereof and then upwardly along the front wall thereof, said belt having its front edge projecting forwardly from the basket portion at a level beneath the end of said platform, and belt gripping means on the counter under the cart end of the platform operable to grip the said front edge of the belt when the cart is moved to unloading position, and means for reversibly driving said belt gripping means.

6. The combination according to claim 5 wherein the means for reversibly driving said belt gripping means comprises a reversible motor connected to said belt gripping means, a normally open reversing switch connected to said motor, and an operating element for the switch position for ready availability to the check out counter operator.

7. The combination, in a merchandise check out arrangement; a check out counter having a platform for receiving articles of merchandise, a cart for transporting the articles having a frame and having a basket portion in the frame at the top, said basket portion having a back wall pivotally connected at the top to said frame and also having a movable bottom connected to the bottom of the back wall, and means on the counter adjacent the end of the platform drivingly engageable with said bottom and selectively energizable for elevating said bottom to elevate articles in the cart, said drive means for drivingly engaging said bottom being engageable with said bottom in response to movement of the cart forwardly into engagement with the end of the counter, and means responsive to movement of the cart into the proximity of its unloading position for urging the cart toward the end of the counter to effect engagement of said bottom by said drive means.

8. The combination, in a merchandise check out arrangement; a check out counter having a platform for receiving articles of merchandise, a cart for transporting the articles having a frame and having a basket portion in the frame at the top, said basket portion having a back wall pivotally connected at the top to said frame and also having a movable bottom connected to the bottom of the back wall, and means on the counter adjacent the end of the platform drivingly engageable with said bottom and selectively energizable for elevating said bottom to elevate articles in the cart, said drive means for drivingly engaging said bottom being engageable with said bottom in response to movement of the cart forwardly into engagement with the end of the counter, and ramp means positioned to engage wheels of the cart when the cart is moved into the proximity of its unloading position and operable to urge the cart toward unloading position.

9. The combination, in a merchandise check out arrangement; a check out counter having a platform for receiving articles of merchandise, a cart for transporting the articles having a frame and having a basket portion in the frame at the top, said basket portion having a back wall pivotally connected at the top to said frame and also having a movable bottom connected to the bottom of the back wall, and means on the counter adjacent the end of the platform drivingly engageable with said bottom and selectively energizable for elevating said bottom to elevate articles in the cart, said drive means for drivingly engaging said bottom being engageable with said bottom in response to movement of the cart forwardly into engagement with the end of the counter, and positioning means for urging the cart toward the end of the counter to effect engagement of said bottom by said drive means comprising electromagnet means on the counter, and armature means on the cart which is located in the field of said electromagnet means when the cart is in unloading position.

10. The combination, in a check out arrangement; of a check out counter and an article transporting cart, said cart having a basket portion at the top, said counter having an article receiving platform at about the level of the top of the basket portion of the cart, said cart having an unloading position wherein its forward end is adjacent the counter at one end of said platform, the back wall of said basket portion being at the top edge thereof being pivotally connected to the top of said basket portion so as to be swingable inwardly of the basket portion, a belt attached to the bottom edge of said back wall and extending forwardly along the bottom of the basket portion to the front thereof and then upwardly along the front wall thereof, a roller on the cart adjacent the top of the front wall to which the belt is attached, and means on the counter engageable with said roller when the cart is in unloading position energizable for driving the roller to wind the belt up thereon.

11. The combination, in a check out arrangement; of a check out counter and an article transporting cart, said cart having a basket portion at the top, said counter having an article receiving platform at about the level of the top of the basket portion of the cart, said cart having an unloading position wherein its forward end is adjacent the counter at one end of said platform, the back wall of said basket portion being at the top edge thereof being pivotally connected to the top of said basket portion so as to be swingable inwardly of the basket portion, a belt attached to the bottom edge of said back wall and extending forwardly along the bottom of the basket portion to the front thereof and then upwardly along the front wall thereof, a roller on the cart adjacent the top of the front wall to which the belt is attached, a spring biasing said roller to wind the belt up thereon so the belt will normally be wound up on the roller but will unwind and move downwardly in said basket portion as articles are placed thereon, and means on the counter engageable with the roller when the cart is in unloading position energizable for driving the roller to wind the belt up thereon.

12. A cart for use as a transport for articles of merchandise selected by shoppers and for co-operation with an automatic unloading check out counter comprising; a frame, a basket portion in the upper part of the frame, the back wall of said basket portion being pivotally connected at the top edge to the frame so as to be swingable inwardly at the bottom, said basket portion having a bottom flexibly connected to the bottom edge of the back wall and a front wall flexibly connected to the front edge of the bottom, said front wall having means at its upper edge for engagement by driving means for driving the front wall upwardly to elevate said bottom while simultaneously swinging the back wall forwardly.

13. A cart for use as a transport for articles of merchadise selected by shoppers and for co-operation with an automatic unloading check out counter comprising; a frame, a basket portion in the upper part of the frame, the back wall of said basket portion being pivotally connected at the top edge to said frame so as to be swingable inwardly at the bottom, said basket portion having a bottom flexibly connected to the bottom edge of the back wall and a front wall flexibly connected to the front edge of the bottom, said front wall having means at its upper edge for engagement by driving means for driving the front wall upwardly to elevate said bottom while simultaneously swinging the back wall forwardly, said bottom and front wall being flexible, said basket portion comprising means beneath said bottom and in front of said front wall to support said flexible bottom and front wall, said bottom and front wall being movable endwise under the influence of said driving means to swing the back wall inwardly to substantially a horizontal position to lift articles in the cart and to move the articles forwardly therein.

14. A cart for use as a transport for articles of merchandise selected by shoppers and for co-operation with an automatic unloading check out counter comprising; a frame, a basket portion in the upper part of the frame, the back wall of said basket portion being pivotally connected at its top edge to the frame so as to be swingable inwardly at the bottom, said basket portion having a bottom flexibly connected to the bottom edge of the back wall and a front wall flexibly connected to the front edge of the bottom, said front wall having means at its upper edge for engagement by driving means for driving the front wall upwardly to elevate said bottom while simultaneously swinging the back wall forwardly, at least said front wall being flexible, said cart having hand grips at the front part of the upper side edges thereof for manipulation of the cart by the check out attendant.

15. A cart for use as a transport for articles of merchandise selected by shoppers and for co-operation with an automatic unloading check out counter comprising; a frame, a basket portion in the upper part of the frame, the back wall of said basket portion being at its top edge being pivotally connected to the frame so as to be swingable inwardly of the basket portion at the bottom, said basket portion having a bottom flexibly connected to the bottom edge of the back wall and a front wall flexibly connected to the front edge of the bottom, said front wall having means at its upper edge for engagement by driving means for driving the front wall upwardly to elevate said bottom while simultaneously swinging the back wall forwardly, at least said front wall being flexible, said cart having means at the sides thereof in front and toward the top forming generally vertical guides, a plate extending laterally of the cart having its side edges engaged by and guided by said guides for vertical and horizontal swinging movement on the cart, support means on the guides for engaging and supporting said plate in a substantially vertical position in the cart, and means for disengaging the plate from said support means when the plate is moved vertically so that it can be tilted outwardly in front of the cart to form a bridge between the cart and a counter.

16. A cart for use as a transport for articles of merchandise selected by shoppers and for co-operation with an automatic unloading check out counter comprising; a frame, a basket portion in the upper part of the frame, said basket portion being open at the rear, a flexible belt-like member pivotally attached to the frame at the top of the back of the basket portion, said member having a back portion extending downwardly along the back of the basket to form a closure therefor and a bottom portion extending forwardly along the bottom of the basket portion and a front portion extending upwardly along the front of the basket portion, and means at the upper edge of the portion of said member that extends upwardly along the said front of the basket portion adapted for engagement by driving means on a check out counter for moving the said member to elevate the bottom portion thereof while moving the back portion thereof forwardly.

17. A cart for use as a transport for articles of merchandise selected by shoppers and for co-operation with an automatic unloading check out counter comprising; a frame, a basket portion in the upper part of the frame, said basket portion being open at the rear, a flexible belt-like member pivotally attached to the frame at the top of the back of the basket portion, said member having a back portion extending downwardly along the back of the basket portion to form a closure therefor, and a bottom portion extending forwardly along the bottom of the basket portion and a front portion extending upwardly along the front of the basket portion, and means at the upper edge of the portion of said member that extends upwardly along the said front wall of the basket adapted for engagement by driving means on a check out counter for moving the said member to elevate the bottom portion thereof while moving the back portion thereof forwardly, the said basket portion having inwardly extending flanges along the back edges of the side walls thereof adapted for engaging and supporting the portion of said member that extends downwardly along the back of said basket portion.

18. In combination; a cart for use as a transport for articles of merchandise selected by shoppers comprising; a frame, a basket portion in the upper part of the frame comprising a U-shaped member extending in the fore and aft direction of the cart and smaller in the front than in the back, a steel plate extending across the front of said U-shaped member and attached thereto, flange means extending inwardly from the back edges of the side walls of said U-shaped member, a rod extending laterally of the U-shaped member at the top edge of the back portion thereof, a flexible belt pivotally connected to said rod and extending downwardly inside the flange means to the bottom of the U-shaped member and then forwardly along the bottom thereof to the front thereof and then upwardly inside said plate, a check out counter having a reel at the end engageable with said hook member when the cart is in unloading position at the said end of the counter and rotatable for reeling up said belt, a drive motor in the check out counter connected with the reel selectably operable for reversibly driving the reel, an energizing circuit for the motor, and a proximity switch carried by the check out counter normally interrupting said energizing circuit and operable automatically when the cart is moved into unloading position whereby the steel plate of the cart is brought into a predetermined position at the said end of the check out counter for making said circuit effective.

References Cited in the file of this patent

UNITED STATES PATENTS

| | | |
|---|---|---|
| 1,088,100 | Saunders | Feb. 24, 1924 |
| 2,529,263 | Reese | Nov. 7, 1950 |
| 2,672,218 | Genung | Mar. 16, 1954 |
| 2,943,707 | Ramlose | July 5, 1960 |
| 2,980,212 | Foster | Apr. 18, 1961 |
| 3,028,931 | Donovan | Apr. 10, 1962 |
| 3,036,722 | Sharaway | May 29, 1962 |